Nov. 25, 1930.   A. E. JAMES   1,782,508
AERO VEHICLE
Filed Nov. 14, 1929   2 Sheets-Sheet 2

Inventor:
A. E. James
by Monroe E. Miller
Attorney.

Patented Nov. 25, 1930

1,782,508

UNITED STATES PATENT OFFICE

ALVIN ELMO JAMES, OF WAYCROSS, GEORGIA

AEROVEHICLE

Application filed November 14, 1929. Serial No. 407,176.

The present invention relates to propeller-driven vehicles, and aims to provide a vehicle of that kind comprising a novel arrangement and assembly of the component elements.

Another object of the invention is to provide a propeller-driven vehicle having novel steering means.

A further object is to provide a propeller driven vehicle which may be used by students when training to become airplane pilots, for ground maneuvers as when taking off and landing, although the vehicle may be used as a sport motorcycle. Runners may also be used in lieu of wheels for use on ice or snow, and the vehicle may be mounted on a boat or pontoons for use on water.

With the foregoing and other objects in view, which will be apparent as the description proceeds, the invention resides in the construction and arrangement of parts as hereinafter described and claimed, it being understood that changes can be made within the scope of what is claimed, without departing from the spirit of the invention.

The invention is illustrated in the accompanying drawings, wherein—

Figure 1:
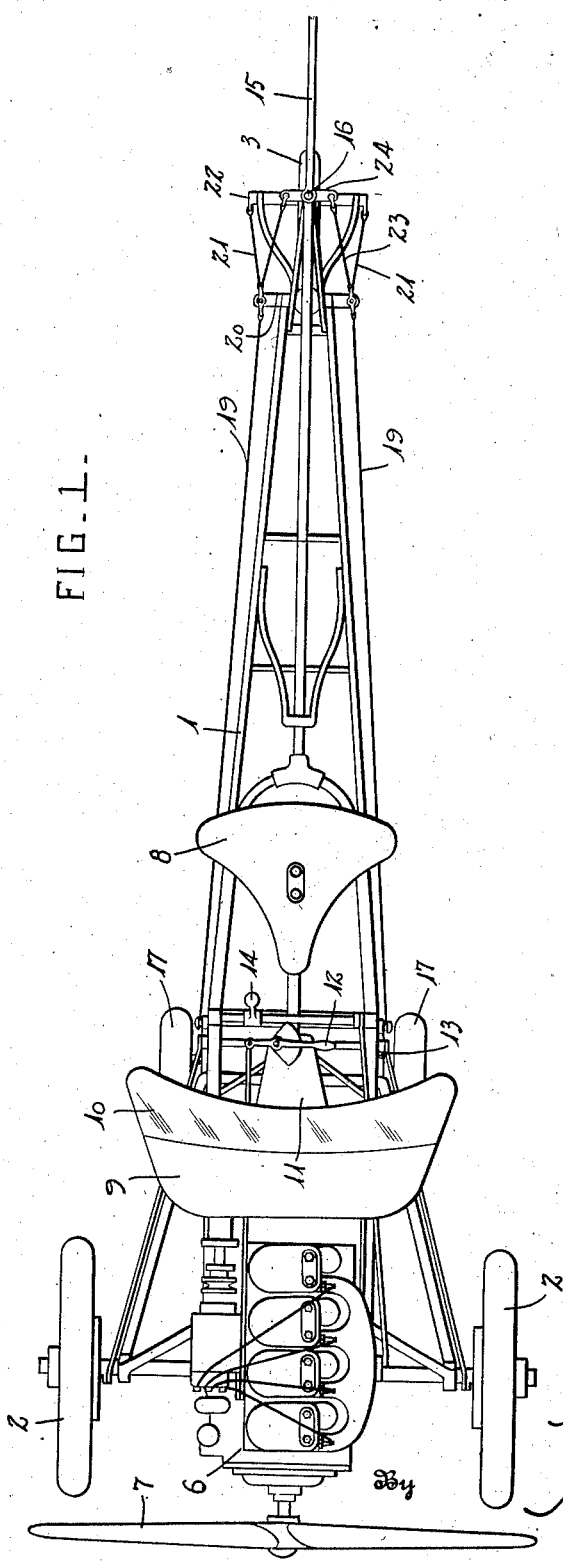
Figure 1 is a plan view of the vehicle.
Figure 2:
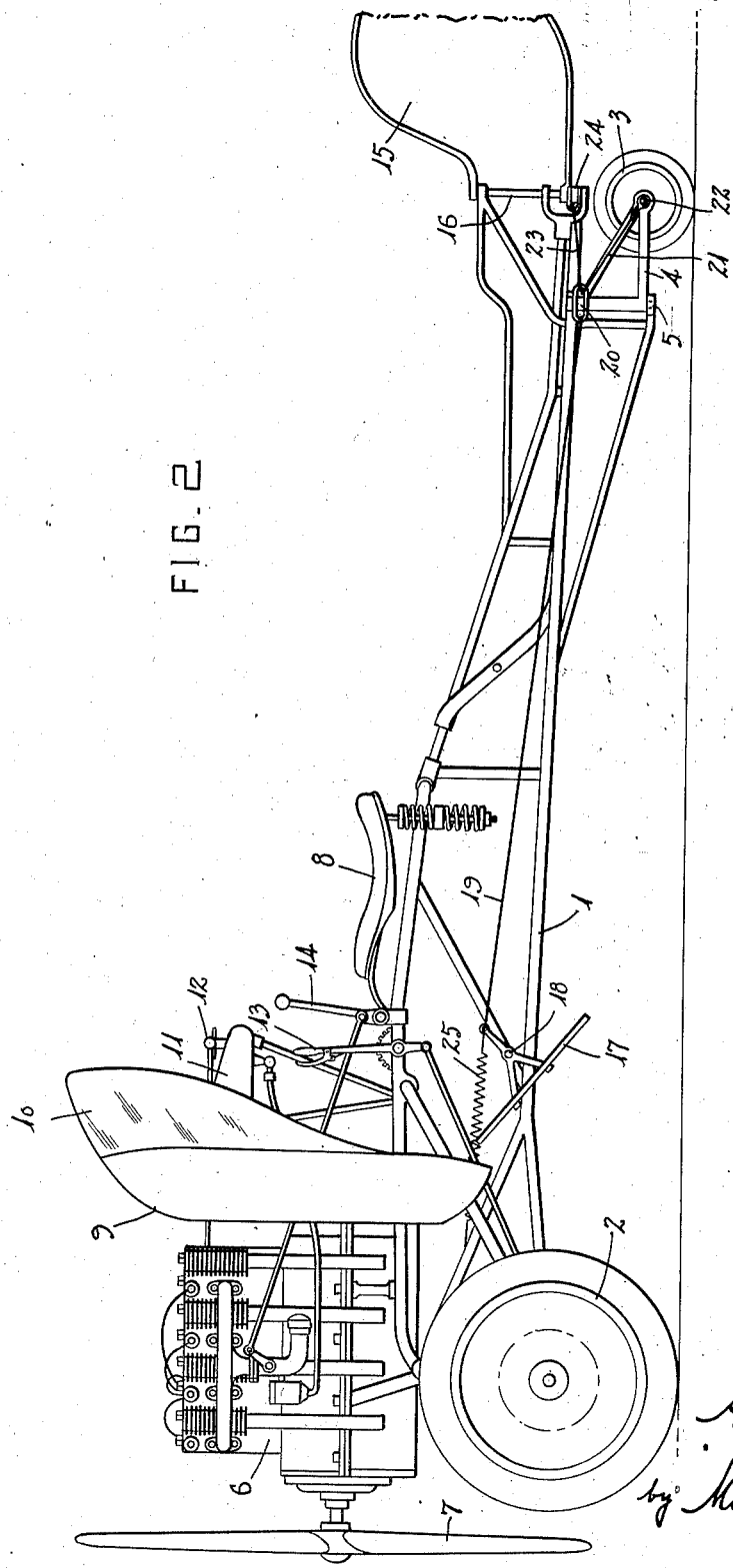
Fig. 2 is a side elevation thereof, a portion of the rudder being broken off.

The vehicle comprises a suitable light frame 1 mounted at its forward end on a pair of front wheels 2, and mounted at its rear end on a rear wheel 3. The rear wheel is a caster wheel mounted in the fork 4 hinged, as at 5, to the rear end of the frame, for purpose of steering the vehicle on the ground.

A suitable engine 6 is mounted on the frame above the front axle, and drives a traction propeller 7 which propels the vehicle.

A seat 8 for the operation is mounted on the frame between the ends thereof, in rear of the engine, and a dash 9 of sheet metal or other suitable material is disposed immediately in rear of the engine in front of the seat to protect the operator from the air current. The dash or shield 9 has an upwardly and rearwardly extending rim 10 of any suitable transparent material, in order that the operator may have forward vision through same while protected from the air current.

The fuel tank 11 is mounted in rear of the dash 9, as well as the spark control lever 12, brake lever 13 and throttle lever 14. The front wheels 2 are equipped with suitable brakes controlled by the lever 13 for stopping the vehicle.

A steering rudder 15 is hinged, as at 16, to the rear end of the frame above the wheel 3, for steering the vehicle similar to an airplane.

Pedals 17 are pivoted, as at 18, on the opposite sides of the frame to be operated by the feet, and are connected by wires 19 with a lever 20 mounted in the rear portion of the frame. The arms of the lever 20 are connected by wires 21 with the opposite protruding terminals of the axle 22 of the wheel 3, so that the wheel 3 is angled on the ground to assist in steering.

The arms of the lever 20 are connected by other wires 23 with a cross arm lever 24 secured to the rudder 15 for swinging said rudder to steer the vehicle. The lever 24 is shorter than the lever 20 and axle 22 so that the rudder 15 is turned through a greater angle than the wheel 3, in order that the rudder will have the same steering effect in its contact with the air that the wheel 3 has in its contact with the ground.

Springs 25 are connected with the pedals 17 for swinging the wheel 3 and rudder 15 to normal intermediate position when pressure on the pedals is relieved.

The vehicle may be maneuvered on a flying field by a student when training to become an airplane pilot, and will give the effect of an airplane running over the ground when taking off and landing. The student may thus obtain the "feel" as when taxiing an airplane over the ground.

The rudder 15, as above indicated, swings through a greater angle than the wheel 3 in order that the student will have the steering effect of an airplane. The dash or shield 9 in front of the operator will also give an airplane effect.

The machine may also be used as a motorcycle for sport, and the wheels 2 and 3 may be replaced by runners for traveling on ice or snow. The device may also be mounted on a boat or pontoons for use on water, so that the vehicle has a wide field of use, although it is chiefly intended for the preliminary training of airplane pilots.

Having thus described the invention, what is claimed as new is:

1. A vehicle of the character described comprising a frame, a pair of wheels supporting the forward end of the frame, a caster wheel connected to the rear end of the frame, an engine on the forward portion of the frame, a propeller driven by the engine, a rudder hingedly connected to the rear end of the frame, and steering gear connected to both the rudder and said caster wheel for simultaneously swinging them.

2. A vehicle of the character described comprising a frame, an engine on the frame, a propeller driven by the engine, a steering member connected with the frame to support one end thereof, a rudder connected with the frame, and a steering gear connected with both said member and rudder for simultaneously swinging them.

3. A vehicle of the character described comprising a frame, an engine on the frame, a propeller driven by the engine, a steering member connected with the frame to support one end thereof, a rudder connected with the frame, and a steering gear connected with said member and having a connection with the rudder for swinging the rudder through a larger angle than said member.

4. A vehicle of the kind described comprising a frame, a pair of wheels supporting the forward end of the frame, a hinged wheel supporting the rear end of the frame, an engine on the frame, a propeller driven by the engine, a rudder connected to the rear end of the frame, and a steering gear connected with said hinged wheel and rudder for swinging them simultaneously, said connection being such as to swing the rudder through a larger angle than the hinged wheel.

In testimony whereof I hereunto affix my signature.

ALVIN ELMO JAMES.